(12) United States Patent
Du et al.

(10) Patent No.: US 10,561,073 B2
(45) Date of Patent: Feb. 18, 2020

(54) INFRARED ABSORBING, HEAT RETAINING FILM

(71) Applicant: Dow Global Technologies LLC, Midland, MI (US)

(72) Inventors: Libo Du, Shanghai (CN); Hongyu Chen, Shanghai (CN); Qing Shi, Shanghai (CN); Yong Chen, Shanghai (CN); Hong Liang Zhang, Shanghai (CN); Hong Zheng, Songjiang (CN); QiQi Tang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/770,671

(22) PCT Filed: Oct. 30, 2015

(86) PCT No.: PCT/CN2015/093345
§ 371 (c)(1),
(2) Date: Apr. 24, 2018

(87) PCT Pub. No.: WO2017/070925
PCT Pub. Date: May 4, 2017

(65) Prior Publication Data
US 2018/0310490 A1  Nov. 1, 2018

(51) Int. Cl.

| | | |
|---|---|---|
| *A01G 9/14* | (2006.01) | |
| *C08K 3/34* | (2006.01) | |
| *B29B 9/06* | (2006.01) | |
| *B29C 48/00* | (2019.01) | |
| *B29C 48/92* | (2019.01) | |
| *B29C 48/625* | (2019.01) | |
| *B29C 48/40* | (2019.01) | |
| *B29C 48/04* | (2019.01) | |
| *B29C 48/10* | (2019.01) | |
| *C08K 3/22* | (2006.01) | |
| *B29K 23/00* | (2006.01) | |
| *B29K 509/00* | (2006.01) | |

(52) U.S. Cl.
CPC ............. *A01G 9/1438* (2013.01); *B29B 9/06* (2013.01); *B29C 48/0022* (2019.02); *B29C 48/04* (2019.02); *B29C 48/10* (2019.02); *B29C 48/40* (2019.02); *B29C 48/625* (2019.02); *B29C 48/92* (2019.02); *C08K 3/34* (2013.01); *B29C 2948/926* (2019.02); *B29C 2948/9259* (2019.02); *B29C 2948/92704* (2019.02); *B29C 2948/92876* (2019.02); *B29C 2948/92885* (2019.02); *B29C 2948/92895* (2019.02); *B29K 2023/0625* (2013.01); *B29K 2023/0633* (2013.01); *B29K 2023/083* (2013.01); *B29K 2509/00* (2013.01); *C08K 3/22* (2013.01); *C08L 2207/066* (2013.01)

(58) Field of Classification Search
CPC .... B29K 2023/0625; B29K 2023/0633; B29K 2023/083; C08K 3/22
See application file for complete search history.

(56) References Cited

U.S. PATENT DOCUMENTS

| | | |
|---|---|---|
| 6,248,817 B1 | 6/2001 | Takado |
| 7,375,162 B2 | 5/2008 | Strebel et al. |
| 2005/0054779 A1 | 3/2005 | Zhou |
| 2013/0085231 A1 | 4/2013 | Lue et al. |

FOREIGN PATENT DOCUMENTS

| | | | |
|---|---|---|---|
| CN | 1035310 A | * | 9/1989 |
| CN | 1077034 C | | 1/2002 |
| CN | 102844371 A | | 12/2012 |
| CN | 103819783 A | | 5/2014 |
| CN | 104558795 A | | 4/2015 |
| EP | 0526117 | | 2/1993 |
| EP | 0761427 A1 | | 3/1997 |
| EP | 1052223 B1 | | 6/2010 |
| IN | 6496/CHENP/2010 A | | 10/2010 |
| JP | 2001089610 | | 4/2001 |
| JP | 2007060926 A | | 3/2007 |
| JP | 2007062042 A | | 3/2007 |
| JP | 1636973 B2 | | 2/2011 |
| WO | 2006079930 A1 | | 8/2006 |

OTHER PUBLICATIONS

Machine translation of JP 2007062042. (Year: 2007).*
Machine translation of CN-1035310-A. (Year: 1989).*
International Search Report and Written Opinion pertaining to PCT/CN2015/093345 dated Jul. 26, 2016.
Extended European Search Report, dated Apr. 30, 2019, pertaining to EPO Application No. 15906988.9.

* cited by examiner

*Primary Examiner* — Wenwen Cai
(74) *Attorney, Agent, or Firm* — Dinsmore & Shohl LLP

(57) ABSTRACT

Embodiments of films, for example, infrared absorbing, heat retaining films, comprise at least one polymer selected from: a low density polyethylene (LDPE) having a density range of 0.900 g/cc to 0.930 g/cc and a melt index ($I_2$) of 0.3 g/10 min to 2.0 g/10 min as measured in accordance with ASTM D1238; a linear low density polyethylene (LLDPE) having a density range of 0.900 g/cc to 0.930 g/cc and a melt index $I_2$ of 0.3 g/10 min to 2.0 g/10 min; and a ethylene vinyl acetate copolymer having a vinyl acetate content ranging from 3 wt. % to 27 wt. % and a melt index $I_2$ of 0.2 g/10 min to 10 g/10 min. The films also comprise a hybrid filler comprising (i) a layered double hydroxide, and (ii) an inorganic powder complex having a particle size distribution defined by a median diameter (D50) of 1.5 to 20 μm.

14 Claims, 2 Drawing Sheets

INFRARED ABSORBING, HEAT RETAINING FILM

TECHNICAL FIELD

Embodiments of the present disclosure are generally related to infrared (IR) absorbing heat retaining films, and are specifically related to infrared (IR) absorbing heat retaining films comprising one or more polymers and a hybrid filler.

BACKGROUND

Greenhouse films are widely used films which retain heat inside greenhouses to ensure there is sufficient warmth for plant growth. In order to reduce the heat loss at night, good IR absorption capability is required for a greenhouse film. The wavelength of the ground IR radiation is mainly in the 7-14 μm region, thus adding a suitable IR absorber with a strong IR absorption in the 7-14 μm wavelength region can enhance the IR absorption and heat retention of the film. The conventional approach for heat retention improvement is adding ethylene vinyl acetate (EVA).

EVA demonstrates good IR absorption in the 7-14 μm wavelength region. However, the EVA content in the film is usually very high in order to achieve adequate IR absorption. This increases the film costs and results in poor mechanical properties, such as tensile strength, tear strength, etc.

As a result, there may be a continual need for improved films which provide heat retention and IR absorption, while maintaining desirable mechanical strength properties in the film.

SUMMARY

Embodiments of the present disclosure are directed to films which provide heat retention and IR absorption, while also providing desirable optical properties and improved mechanical strength properties as compared to conventional greenhouse films.

According to one embodiment of the film, the film comprises at least one polymer selected from: a low density polyethylene (LDPE) having a density range of 0.900 g/cc to 0.930 g/cc and a melt index ($I_2$) of 0.3 g/10 min to 2.0 g/10 min as measured in accordance with ASTM D1238; a linear low density polyethylene (LLDPE) having a density range of 0.900 g/cc to 0.930 g/cc and a melt index $I_2$ of 0.3 g/10 min to 2.0 g/10 min; and a ethylene vinyl acetate copolymer having a vinyl acetate content ranging from 3 wt. % to 27 wt. % and a melt index $I_2$ of 0.2 g/10 min to 10 g/10 min. The film also comprises a hybrid filler comprising (i) a layered double hydroxide, and (ii) an inorganic powder complex having a particle size distribution defined by a median diameter (D50) of 1.5 to 20 μm.

Additional features and advantages of the embodiments described herein will be set forth in the detailed description which follows, and in part will be readily apparent to those skilled in the art from that description or recognized by practicing the embodiments described herein, including the detailed description which follows, and the claims.

BRIEF DESCRIPTION OF THE DRAWINGS

The following detailed description of specific embodiments of the present disclosure can be best understood when read in conjunction with the drawings enclosed herewith.

Figure 1:
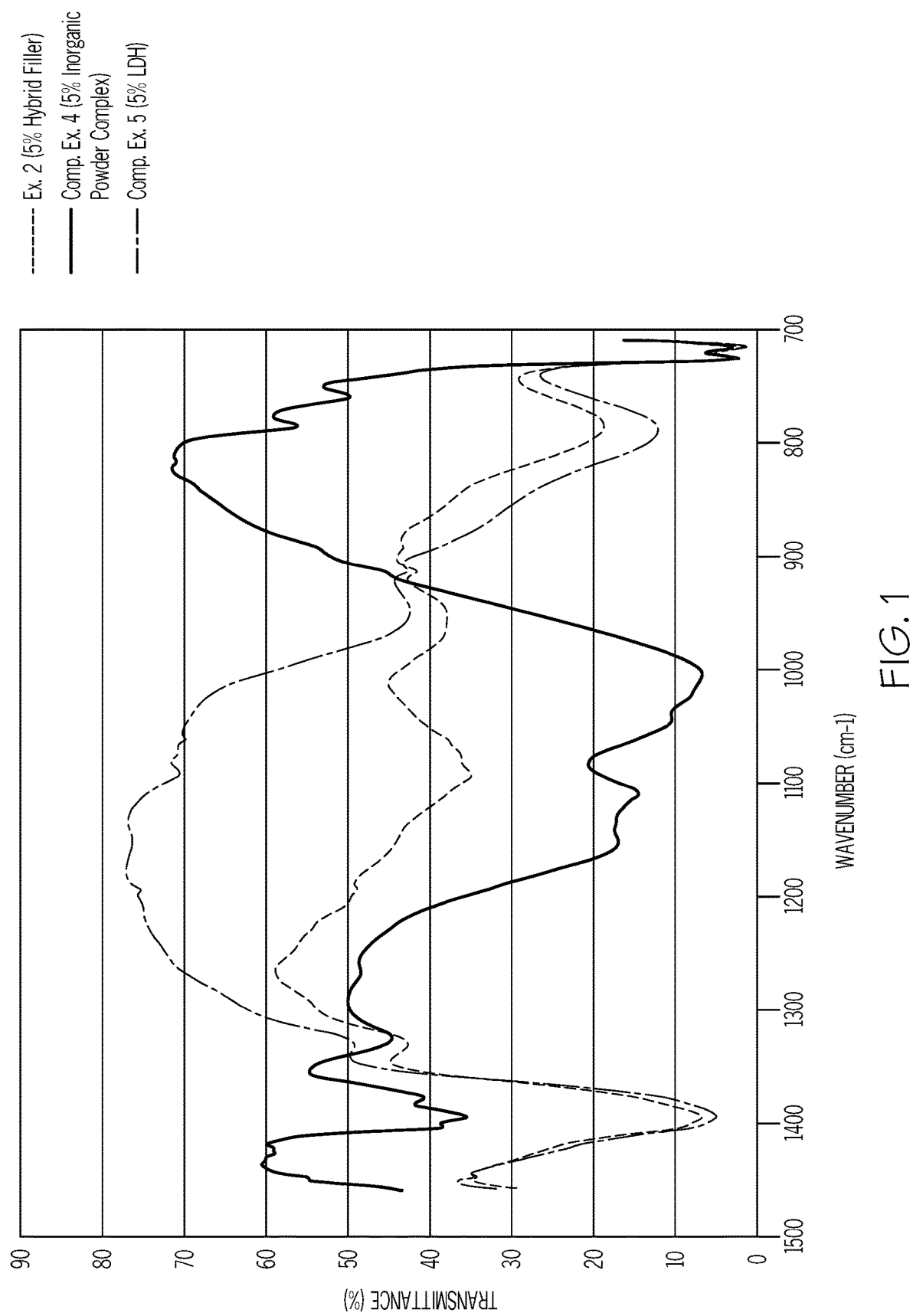
FIG. 1 is a graphical illustration depicting the effect on transmittance using the hybrid filler in comparison to using only the powder complex or only the LDH in accordance with one or more embodiments of the present disclosure.

The embodiments set forth in the drawings are illustrative in nature and not intended to the claims. Moreover, individual features of the drawings will be more fully apparent and understood in view of the detailed description.

DETAILED DESCRIPTION

Embodiments of the present disclosure are directed to films, for example, transparent heat retention films with IR absorption properties suitable for greenhouse film applications, etc. The film may comprise at least one polymer selected from low density polyethylene (LDPE), linear low density polyethylene (LLDPE), ethylene vinyl acetate (EVA) copolymer, and blends thereof, and a hybrid filler comprising a layered double hydroxide, and an inorganic powder complex powder having a particle size distribution defined by a median diameter (D50) of 1.5 to 20 μm, wherein the D50 is calculated in accordance with ASTM C1070-01(2007).

The LDPE may encompass various polymers, whether produced by catalysis using Ziegler-Natta catalysts or metallocene catalysts. In one or more embodiments, the LDPE may have a density of 0.900 g/cc to 0.930 g/cc as measured according to ASTM D792, or a density of 0.910 g/cc to 0.925 g/cc, or a density of 0.915 g/cc to 0.925 g/cc. Moreover, the LDPE may have a melt index ($I_2$) of 0.1 g/10 min to 10.0 g/10 min as measured in accordance with ASTM D 1238 (Condition 190° C./2.16 kg), or an $I_2$ of 0.2 g/10 min to 2.0 g/10 min, or an $I_2$ from 0.2 to 0.5 g/10 min. Commercial embodiments of the LDPE may include DOW™ 132I from The Dow Chemical Company, Midland, Mich.

The LLDPE may also encompass various polymers, whether produced by catalysis using Ziegler-Natta catalysts or metallocene catalysts. In one or more embodiments, the LLDPE may have a density of 0.900 g/cc to 0.930 g/cc, or a density of 0.910 g/cc to 0.925 g/cc, or a density of 0.915 g/cc to 0.925 g/cc. Moreover, the LLDPE may have a melt index ($I_2$) of 0.1 g/10 min to 10.0 g/10 min when measured in accordance with ASTM D 1238 (Condition 190° C./2.16 kg), or an $I_2$ from 0.3 g/10 min to 2.0 g/10 min, or an $I_2$ from 0.5 to 1.0 g/10 min. Commercial embodiments of the LLDPE may include DOWLEX™ 2045 G from The Dow Chemical Company, Midland, Mich.

The EVA may encompass polymers having a vinyl acetate content ranging from 3 wt % to 27 wt %, or from 8 wt % to 20 wt %, or from 9 wt % to 18 wt. The EVA may further have a melt index ($I_2$) of 0.2 g/10 min to 10 g/10 min, or an $I_2$ from 0.3 g/10 min to 2.0 g/10 min, or an $I_2$ from 0.5 to 1.0 g/10 min. Commercial embodiments of the EVA may include Elvax® 470 from DuPont, or HANWHA EVA 2040 from Hanhwa Chemical.

As stated above, the film may comprise blends of the above polymers. For example, the film may comprise a blend of EVA and at least one of LLDPE and LDPE. For EVA containing embodiments, the film may comprise a weight ratio of EVA to LLDPE plus LDPE of 100/0 to 20/80. In alternative embodiments, the film may comprise LDPE, LLDPE, or blends thereof. In such embodiments, the film may comprise 0-99.7 wt % of LLDPE, LDPE, or both, or 20-99.6 wt % of LLDPE, LDPE, or both. In embodiments having a blend of LDPE and LLDPE, the film may comprise 10 wt % to 50 wt % LDPE and 50 to 90 wt % LDPE, or 20 wt % to 30 wt % LDPE and 60 to 80 wt % LDPE. Without being bound by theory, polyethylene films having one or more of LLDPE and LDPE and the hybrid filler can downgauge (i.e., use thinner film thicknesses) and reduce costs while maintaining the same IR absorption properties as thicker EVA based commercial films in greenhouse film applications. Consequently, one or more embodiments of the present disclosure are directed to polyethylene films which replace or reduce the amount of EVA in greenhouse films, while maintaining the desired IR absorption and heat retention, reducing film production costs, and improving film mechanical properties in the films.

Whether the blend includes a single polymer or multiple polymers, the polymer may comprise a melt index ($I_2$) from 0.2 g/10 min to 10.0 g/10 min, or an $I_2$ from 0.3 g/10 min to 2 g/10 min, or an $I_2$ from 0.3 g/10 min to 1 g/10 min.

As stated above, the hybrid filler comprises a layered double hydroxide (LDH). In one or more embodiments, the LDH may be characterized by the following formula $(Al_2Li_{(1-x)}M^{2+}_{(x+y)}(OH)_{(6+2y)})_2(CO_3^{2-})_{(1+x)} \cdot mH_2O)$ wherein $M^{2+}$ is at least one divalent metal ion selected from Mg, Zn, Ca, Fe, Cu, Mn and Ni, m, x and y are numbers respectively in the ranges of $0 \le m < 10$, $0 \le x \le 1$ and $0 \le y \le 6$. In another embodiment, the layered double hydroxide comprises hydrotalcite. Without being bound by theory, LDH is a suitable filler that can be used as an IR absorber in films, specifically films including LLDPE, LDPE, or blends thereof, because of its small particle size (for example, a D50 median diameter of about 0.4 μm to 0.8 μm) and similar refractive index to that of LLDPE and LDPE. Commercial LDH products may have IR absorption peaks at about 7.3 μm and 12.6 μm; however, these products do not have IR peaks in the 9 to 11 μm wavelength range. Suitable commercial LDH products may include MAGCELER-1 produced by Kyowa Chemical Industry Co., Ltd.

To achieve IR peaks within the 9 to 11 μm wavelength range, the hybrid filler also includes an inorganic powder complex. Various compositions are contemplated for the inorganic powder complex, for example, natural mineral blends, synthetic mineral composites, or combinations thereof. The natural mineral blend may comprise 55-65 wt % silicon oxide ($SiO_2$), 15-25 wt % aluminum oxide ($Al_2O_3$), 8-14 wt % sodium oxide ($Na_2O$), 2-7 wt % potassium oxide ($K_2O$), whereas the synthetic composite may comprise 55-65 wt % $SiO_2$, 15-25 wt % $Al_2O_3$, 10-15 wt % boron oxide ($B_2O_3$), 5-10 wt % calcium oxide (CaO). In one or more embodiments, the inorganic powder complex powder complex may comprise a particle size distribution defined by a median diameter (D50) of 1.5 to 20 μm, or less than 5 μm, wherein the D50 is calculated in accordance with ASTM C1070-01.

Commercial embodiments of the inorganic powder complex may include MINBLOC® SC-2 produced by Sibelco Specialty Minerals Europe. MINBLOC SC-2, which is a complex of nepheline ($KNa_3(AlSiO_4)_4$), albite ($NaAlSi_3O_8$), and microcline ($KAlSi_3O_8$), may be used as an anti-blocking agent as well as an IR absorber in greenhouse films, because it has a wide and strong IR absorption peak at 8.3 μm to 11.1 μm.

The combination of the LDH and the inorganic powder complex in the hybrid filler yields synergistic effects in simultaneously achieving excellent IR absorption, as well as strong optical performance and mechanical strength. In one or more embodiments, the refractive index of the hybrid filler is from 1.49 to 1.53, or from 1.50 to 1.52.

Various amounts are contemplated for the hybrid filler in the film. In one or more embodiments, the hybrid filler may comprise from 0.2 wt % to 13 wt % of the hybrid filler, based on the total weight of the film, or from 0.2 wt % to 8 wt %, or from 4 wt % to 8 wt % of the hybrid filler, based on the total weight of the film. In further embodiments, the film may comprise 0.1 wt % to 8 wt % of the layered double hydroxide, and 0.1 wt % to 5 wt % of the inorganic powder complex. Moreover, the film may comprise 0.2 wt % to 5 wt % of the layered double hydroxide, and 0.2 wt % to 3.2 wt % of the inorganic powder complex. In additional embodiments, the weight ratio of the layered double hydroxide and the inorganic powder complex may be from 0.2 to 5, or from 0.4 to 2.5. In exemplary embodiments, the hybrid filler may comprise 40 wt % to 60 wt % LDH to achieve the desired thermicity as described further below.

Additional optional components may also be added to the films. For example, the film may comprise one or more of 0.05-1 wt % antioxidant, 0.2-2 wt % UV stabilizer, 0.2-2 wt % UV absorber, 0.01-0.2 wt % anti-fogging agent, and 1-5 wt % anti-dripping agent. Various compositions are contemplated for these optional components. Commercial embodiments of the antioxidant may include the BASF supplied Irganox® B900, which is a blend of 20% octadecyl-3-[3,5-di-tert-butyl-4-hydroxyphenyl]propionate] and 80% tris(2,4-ditert-butylphenyl)phosphite. For the UV stabilizer, commercially suitable embodiments may include the Chimassorb® high-molecular-weight, hindered amine light stabilizers supplied by BASF, specifically, the Chimassorb® 944 UV stabilizer product. For the UV absorber, commercially suitable embodiments may include the Chimassorb® high-molecular-weight, hindered amine light absorbers supplied by BASF, specifically, the Chimassorb® 81 UV absorber product. Suitable anti-fogging agents may include the TF-31 product supplied by Fengsheng Industrial Co., Ltd. Suitable anti-dripping agents may include the KF650 product supplied by Rikevita Fine Chemical & Food Industry.

Structurally, it is contemplated that the film may be a monolayer film or multilayer film. While much larger layering structures are considered suitable, the multilayer film may have from 2 to 9 layers. The film is also considered suitable for various applications. In one embodiment, the film may be used in blown film applications. Various dimensions and thickness are contemplated for the films. In one or more embodiments, the film may have a thickness of from 40 μm to 150 μm, or from 60 μm to 120 μm, or from 70 μm to 100 μm.

As stated previously, the present films demonstrate IR absorption suitable for greenhouse films. In one or more embodiments, the present films may exhibit a thermicity of less than 70% at a film thickness of 80 μm, or a thermicity less than 50% at a film thickness of 80 μm, or a thermicity less than 30% at a film thickness of 80 μm. As used herein, "thermicity" is defined as average IR transmittance in the 7-14 μm wavelength region. As would be familiar to the skilled person, IR transmittance is the inverse of IR absorbance, thus decreased IR transmittance means increased IR absorbance. Consequently, lower thermicity values, which correlate to lower IR transmittance values, indicate better thermal barrier properties for the film.

Optically, the films may demonstrate a haze of less than 25% at a film thickness of 80 μm, or a haze of less than 20% at a film thickness of 80 μm, a haze of less than 15% at a film thickness of 80 μm, when measured according to ASTM D1003. Moreover, the films may also demonstrate a clarity of greater than 70% at a film thickness of 80 μm, or a clarity greater than 80% at a film thickness of 80 μm, or a clarity greater than 90% at a film thickness of 80 μm, when measured according to ASTM D1746.

Moreover, in further embodiments, the films may exhibit one or more of the following characteristics: a thermicity of less than 70% at a film thickness of 80 μm; a haze of less than 25% at a film thickness of 80 μm; or a clarity of greater than 70% at a film thickness of 80 μm. In further embodiments, all three of these characteristics are met by the films.

As stated above, the present films demonstrate improved mechanical strength. In one embodiment, the present films may demonstrate a secant modulus (2%) greater than 100 MPa in the machine direction (MD), the transverse direction (TD), or in both directions. In further embodiments, the films may demonstrate a secant modulus (2%) greater than 150 MPa, or greater than 175 MPa in the MD, the TD, or both directions. Furthermore, the present films may demonstrate an Elmendorf tear strength greater than 300 g in the MD, and an Elmendorf tear strength greater than 1800 g in the TD direction Turning to the synthesis of the film, various methodologies are contemplated for making the film. In one embodiment, the synthesis method comprises pre-mixing the hybrid filler additives (e.g., LDH and inorganic powder complex) with an LDPE powder to produce a mixed powder, compounding the mixed powder with LLDPE and/or EVA in an extruder to produce an extruded mixture, pelletizing the extruded mixture, and making the film from the pelletized mixture using a blown film line. Prior to feeding to the blow film line the pellets may be dried. Additional details regarding the synthesis process is provided in the Examples as follows.

EXAMPLES

The following experimental examples illustrate one or more of the features of the present embodiments disclosed above. The blown monolayer film examples of Tables 2 and 3 below use "Comp. Ex." as an abbreviation for comparative example, and "Ex." for examples in accordance with embodiments of the present disclosure.

The film components/raw materials utilized in the monolayer films of Tables 2 and 3 are listed in Table 1 as follows.

TABLE 1

Film raw materials

| Raw material | Vendor |
| --- | --- |
| LDH (MAGCELER-1) | KYOWA |
| MINBLOC (SC-2) | SIBELCO |
| LLDPE (DOWLEX 2045G) | Dow Chemical Company |
| LDPE (DOW 132I) | Dow Chemical Company |
| EVA 2040 | Hanwha Chemical |
| EVA 470 | Du Pont |

Monolayer Film Fabrication Process

The monolayer films of Tables 2 and 3 were produced using the following process.

For present examples 1-3, LDH, MINBLOC, Irganox® B900 (antioxidant) and Chimassorb® 944 (UV stabilizer) were first mixed with LDPE powder in a high speed mixer at 600 rpm for 5 min. Then, this mixture was compounded with LLDPE to fabricate compounds on a Leistritz ZSE27 twin screw extruder having a length/diameter (L/D) ratio equal to 48. The materials were added at the main feed port of the twin screw extruder. The barrel temperature of the twin screw extruder was set to 180° C., the screw speed was 300 rpm, and the feed rate was 20 kg/h. The extruded strands were cooled by water, and then cut into pellets. The pellets were then dried in an oven at 80° C. for 4 hours.

The process of comparative examples 4 and 5 is the same as examples 1-3, with the exception being the use of different fillers than the hybrid filler of examples 1-3. For comparative examples 1-3, the compounding process is simplified. The antioxidant and UV stabilizer may be prepared into a masterbatch, which is then mixed with resin pellets, whether LLDPE, LDPE, and/or EVA, in the ZSE27 twin screw extruder at a temperature of 180° C., a screw speed of 300 rpm, and a feed rate of 20 kg/h.

Monolayer blown films were produced from the dried pellets using a blown film line with a screw diameter of 35 mm, a die diameter of 50 mm, and a die lip of 2 mm. The barrel temperature of the blown film line was from 180 to 200° C., and the screw speed was 20 rpm. Further, the blown film line had a blow-up ratio (BUR) of 2.4 and a lay flat width of 190 mm. As shown in Table 2, the film thicknesses varied between 80 and 100 μm by changing the haul-off speed.

TABLE 2

Film Formulation Details

| Formulations | Comp. Ex. 1 | Comp. Ex. 2 | Comp. Ex. 3 | Comp. Ex. 4 | Comp. Ex. 5 | Ex. 1 | Ex. 2 | Ex. 3 |
| --- | --- | --- | --- | --- | --- | --- | --- | --- |
| Fillers | No filler | No filler | No filler | 5% LDH only | 5% MINBLOC only | 0.6% Hybrid Filler | 5% Hybrid Filler | 8% Hybrid Filler |
| Film thickness (μm) | 100 | 80 | 100 | 80 | 80 | 80 | 80 | 80 |
| LDPE (DOW132I) (wt %) | | 25 | | 25 | 25 | 25 | 25 | 25 |
| LLDPE (DOWLEX 2045G) (wt %) | | 75 | | 70 | 70 | 74.4 | 70 | 67 |
| LDH (MAGCELER 1) (wt %) | | | | 5 | | 0.36 | 3 | 4.8 |
| MINBLOC (SC-2) (wt %) | | | | | 5 | 0.24 | 2 | 3.2 |
| EVA 2040 (9 wt % VA) (wt %) | | | 88.9 | | | | | |

TABLE 2-continued

Film Formulation Details

| Formulations | Comp. Ex. 1 | Comp. Ex. 2 | Comp. Ex. 3 | Comp. Ex. 4 | Comp. Ex. 5 | Ex. 1 | Ex. 2 | Ex. 3 |
|---|---|---|---|---|---|---|---|---|
| EVA470 (18 wt % VA) (wt %) | | | 11.1 | | | | | |

TABLE 3

Film Properties

| Properties | Comp. Ex. 1 | Comp. Ex. 2 | Comp. Ex. 3 | Comp. Ex. 4 | Comp. Ex. 5 | Ex. 1 | Ex. 2 | Ex. 3 |
|---|---|---|---|---|---|---|---|---|
| Thermicity (%) | 67.8 | 72.2 | 41.7 | 47.4 | 38.8 | 69.3 | 37.6 | 23.1 |
| Haze (%) | 12 | 11.3 | 6.5 | 12.3 | 34.1 | 10.8 | 16.9 | 22.2 |
| Clarity (%) | 91.8 | 92.5 | 91.8 | 94.6 | 52.2 | 93.8 | 83.8 | 70.1 |
| Tensile strength, MD (MPa) | 36.9 | 38.5 | 26.3 | 40.2 | 33.1 | 38.6 | 30.4 | 29.3 |
| Tensile strength, TD (MPa) | 41.9 | 39.1 | 27.6 | 41.6 | 32.5 | 37 | 36.3 | 31.7 |
| Elongation at break, MD (%) | 876 | 805 | 775 | 844 | 847 | 801 | 732 | 725 |
| Elongation at break, TD (%) | 913 | 921 | 782 | 894 | 959 | 909 | 892 | 898 |
| Secant 2% Modulus, MD (MPa) | 165 | 190 | 41 | 211 | 185 | 172 | 182 | 201 |
| Secant 2% Modulus, TD (MPa) | 171 | 200 | 41 | 232 | 206 | 196 | 202 | 222 |
| Elmendorf tear, MD (g) | 1168 | 422 | 233 | 735 | 534 | 442 | 481 | 458 |
| Elmendorf tear, TD (g) | 2248 | 2008 | 469 | 2232 | 2442 | 1918 | 2030 | 2153 |
| Dart impact (g) | 434 | 344 | >1000 | 344 | 342 | 344 | 438 | 336 |

Referring to Table 3, Comparative Example 3, which includes EVA, exhibits inferior mechanical strength properties as compared to the other film examples, which are polyethylene based films. Specifically, Example 3 exhibits a Secant 2% Modulus in the MD or TD directions at least 5 times greater than Comparative Example 3, even though Example 3 is thinner than Comparative Example 3. Similarly, Example 3 exhibits an Elmendorf tear strength in the TD direction at least 4 times greater than Comparative Example 3.

Referring to Tables 2 and 3, the thermicity of Example 2, which includes LLDPE/LDPE and 5% hybrid filler is superior to the thermicity of Comparative Examples 4 and 5, which are LLDPE/LDPE blends comprising LDH filler only and Inorganic Powder Complex (MINIBLOC) filler only, respectively. Referring to the IR spectra of FIG. 1, the IR transmittance of Example 2 is below the IR transmittance of the LDH, because the MINIBLOC in the hybrid filler compensates for the high IR transmittance of the LDH in the hybrid filler.

Figure 2:
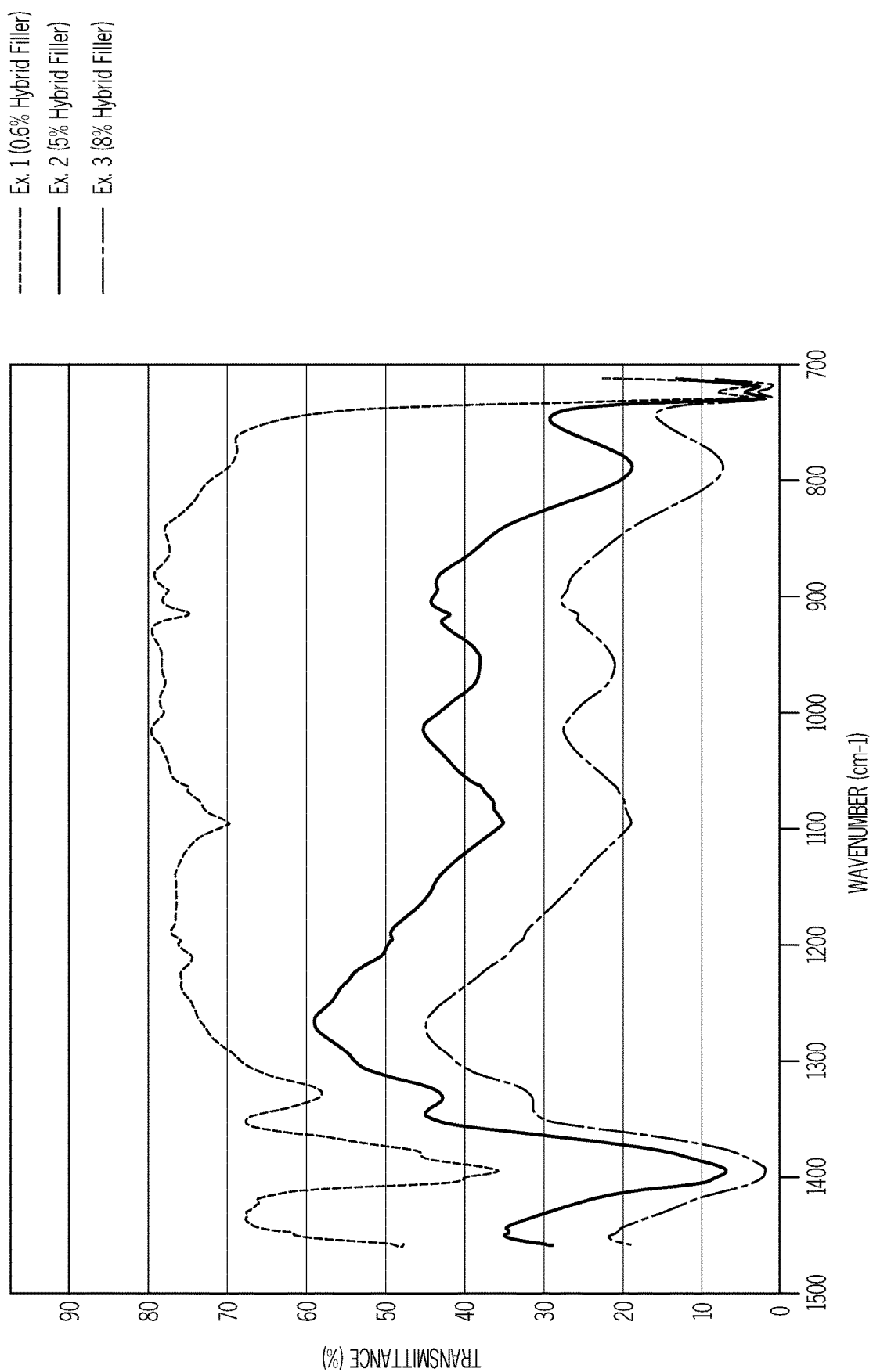
FIG. 2 is a graphical illustration depicting the effect on transmittance caused by increasing the amounts of hybrid filler in accordance with one or more embodiments of the present disclosure.

Referring to FIG. 2, the IR spectra of Example 1 (0.6 wt % Hybrid Filler), Example 2 (5 wt % Hybrid Filler), and Example 3 (8 wt % Hybrid Filler) is depicted. As shown, by increasing the hybrid filler the IR transmittance greatly increases. For example, the thermicity drops from 69% to 23% when hybrid filler content is increased from 0.6 wt % to 8 wt %.

Calculation Methodologies

Mechanical Strength

Tensile strength, elongation at break, secant modulus 2%, and tensile modulus were tested according to ASTM D882. Elmendorf tear strength was tested according to ASTM D1922. Dart impact was tested according to ASTM D1709.

IR Performance

IR transmittance was tested on a Nicolet™ 6700 Fourier Transfer Infrared (FTIR) Spectrometer at a resolution of 4 cm$^{-1}$. Each film sample was scanned 32 times.

Optical Performance

Haze and clarity were tested on a BYK-Gardner Haze Meter. Haze values were measured in accordance with ASTM D1003, and clarity was measured in accordance with ASTM D1746.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A film comprising:
   at least one polymer selected from the group consisting of:

a low density polyethylene (LDPE) having a density range of 0.900 g/cc to 0.930 g/cc and a melt index ($I_2$) of 0.3 g/10 min to 2.0 g/10 min as measured in accordance with ASTM D1238;

a linear low density polyethylene (LLDPE) having a density range of 0.900 g/cc to 0.930 g/cc and a melt index $I_2$ of 0.3 g/10 min to 2.0 g/10 min; and an ethylene vinyl acetate copolymer having a vinyl acetate content ranging from 3 wt. % to 27 wt. % and a melt index $I_2$ of 0.2 g/10 min to 10 g/10 min; and a hybrid filler comprising (i) a layered double hydroxide, and (ii) an inorganic powder complex having a particle size distribution defined by a median diameter (D50) of 1.5 to 20 μm, wherein the inorganic powder complex is a natural mineral blend comprising 55-65 wt % silicon oxide ($SiO_2$), 15-25 wt % aluminum oxide ($Al_2O_3$), 8-14 wt % sodium oxide ($Na_2O$), and 2-7 wt % potassium oxide ($K_2O$); or a synthetic composite comprising 55-65 wt % $SiO_2$, 15-25 wt % $Al_2O_3$, 10-15 wt % boron oxide ($B_2O_3$), and 5-10 wt % calcium oxide (CaO).

2. The film of claim 1 wherein the D50 of the inorganic powder complex is less than 5 μm.

3. The film according to claim 1, wherein the film comprises from 0.2 wt % to 13 wt % of the hybrid filler, based on total weight of the film.

4. The film according to claim 1, wherein the film comprises from 0.2 wt % to 8 wt % of the hybrid filler, based on total weight of the film.

5. The film according to claim 1, wherein the film comprises 0.1 wt % to 8 wt % of the layered double hydroxide, and 0.1 wt % to 5 wt % of the inorganic powder complex.

6. The film according to claim 1, wherein a weight ratio of the layered double hydroxide and the inorganic powder complex is from 0.2 to 5.

7. The film according to claim 1, wherein a refractive index of the hybrid filler is from 1.49 to 1.53.

8. The film according to claim 1, wherein the layered double hydroxide is characterized by the following formula $$(Al_2Li_{(1-x)}M^{2+}{}_{(x+y)}(OH)_{(6+2y)})_2(CO_3{}^{2-})_{(1+x)} \cdot mH_2O,$$

wherein $M^{2+}$ is at least one divalent metal ion selected from the group consisting of Mg, Zn, Ca, Fe, Cu, Mn and Ni, m, x and y are defined respectively as $0 \leq m < 10$, $0 \leq x \leq 1$ and $0 \leq y \leq 6$.

9. The film according to claim 1, wherein the film comprises a blend of LDPE and LLDPE, wherein the film comprises 10 wt % to 50 wt % LDPE and 50 to 90 wt % LLDPE.

10. The film according to claim 1, wherein the film comprises one or more of 0.05-1 wt % antioxidant, 0.2-2 wt % UV stabilizer, 0.2-2 wt % UV absorber, 0.01-0.2 wt % anti-fogging agent, and 1-5 wt % anti-dripping agent.

11. The film according to claim 1, wherein the film has a thickness of from 40 μm to 150 μm.

12. The film according to claim 1, wherein the film is a monolayer film or multilayer film.

13. The film according to claim 1, wherein the film is a blown film.

14. The film according to claim 1, wherein the film exhibits one or more of the following characteristics:

a. a thermicity of less than 70% at a film thickness of 80 μm;

b. a haze of less than 25% at a film thickness of 80 μm when measured in accordance with ASTM D1003; or c. a clarity of greater than 70% at a film thickness of 80 μm when measured in accordance with ASTM D1746.

* * * * *